(12) United States Patent
Yamanaka et al.

(10) Patent No.: US 8,143,907 B2
(45) Date of Patent: Mar. 27, 2012

(54) CAPACITIVE OCCUPANT SENSOR

(75) Inventors: Shoichi Yamanaka, Anjo (JP);
Hideyuki Hayakawa, Nishio (JP);
Hiroyuki Ito, Chita (JP)

(73) Assignee: Denso Corporation, Kariya (JP)

( * ) Notice: Subject to any disclaimer, the term of this patent is extended or adjusted under 35 U.S.C. 154(b) by 171 days.

(21) Appl. No.: 12/802,541

(22) Filed: Jun. 9, 2010

(65) Prior Publication Data

US 2010/0315100 A1 Dec. 16, 2010

(30) Foreign Application Priority Data

Jun. 12, 2009 (JP) ................................. 2009-141186

(51) Int. Cl.
*G01R 27/26* (2006.01)

(52) U.S. Cl. .......... 324/686; 324/658; 324/679; 702/47; 702/52; 297/217.3; 297/452.48; 257/415; 438/50

(58) Field of Classification Search .................. 324/658, 324/686, 679; 702/47, 52; 73/862.337; 297/452.48; 297/217.3; 257/415; 438/50
See application file for complete search history.

(56) References Cited

U.S. PATENT DOCUMENTS

| | | | |
|---|---|---|---|
| 6,356,194 B1 | 3/2002 | Fukui et al. | |
| 6,609,752 B2 * | 8/2003 | Inoue | 297/217.3 |
| 6,794,590 B2 * | 9/2004 | Federspiel | 200/85 R |
| 7,637,532 B2 | 12/2009 | Yamanaka et al. | |
| 2002/0093236 A1 | 7/2002 | Inoue | |
| 2005/0275202 A1 | 12/2005 | Wato et al. | |
| 2006/0164254 A1 * | 7/2006 | Kamizono et al. | 340/667 |
| 2008/0067793 A1 | 3/2008 | Clos et al. | |
| 2008/0100425 A1 | 5/2008 | Kiribayashi | |
| 2008/0180234 A1 | 7/2008 | Yamanaka et al. | |
| 2008/0277910 A1 | 11/2008 | Thompson et al. | |
| 2009/0164070 A1 | 6/2009 | Yamanaka et al. | |
| 2010/0073181 A1 | 3/2010 | Ootaka et al. | |

FOREIGN PATENT DOCUMENTS

| | | |
|---|---|---|
| JP | 09-309373 | 12/1997 |
| JP | 2000-038077 | 2/2000 |
| JP | 2000-062515 | 2/2000 |
| JP | 2000-065658 | 3/2000 |
| JP | 2000-249773 | 9/2000 |
| JP | 2002-211297 | 7/2002 |

(Continued)

OTHER PUBLICATIONS

U.S. Appl. No. 12/802,562, filed Jun. 9, 2010, Yamanaka et al.

*Primary Examiner* — Huy Q Phan
*Assistant Examiner* — Son Le
(74) *Attorney, Agent, or Firm* — Harness, Dickey & Pierce, PLC (57) ABSTRACT

A capacitive occupant sensor includes a sensor mat having U-parts arranged in a first direction and, a second direction perpendicular to each other. The U-parts located adjacent to each other are connected in the second direction so as to define S-parts, in a manner that openings of the U-parts alternately open toward a first side of the first direction or a second side of the first direction. The S-parts located adjacent to each other are combined in the first direction, in a manner that the opening open toward the first side and the opening open toward the second side oppose to each other in the first direction. The mat has a meandering structure defined by the S-parts.

25 Claims, 8 Drawing Sheets

FOREIGN PATENT DOCUMENTS

| | | |
|---|---|---|
| JP | 2003-212018 | 7/2003 |
| JP | 2006-027591 | 2/2006 |
| JP | 2007-101489 | 4/2007 |
| JP | 2008-064501 | 3/2008 |
| JP | 2008-111809 | 5/2008 |
| JP | 2008-181806 | 8/2008 |
| JP | 2009-150783 | 7/2009 |
| JP | 2010-096743 | 4/2010 |
| WO | WO 2008/141205 | 11/2008 |

* cited by examiner

CAPACITIVE OCCUPANT SENSOR

CROSS REFERENCE TO RELATED APPLICATION

This application is based on Japanese Patent Application No. 2009-141186 filed on Jun. 12, 2009 and Japanese Patent Application No. 2009-141604 filed on Jun. 12, 2009, the disclosures of which are incorporated herein by reference in its entirety.

BACKGROUND OF THE INVENTION

1. Field of the Invention

The present invention relates to a capacitive occupant sensor.

2. Description of Related Art

JP-A-2008-38077, JP-A-2008-506962, JP-A-2007-101489, JP-A-2000-65658 or US 2008/0277910 A1 discloses a device to detect an occupant seated on a vehicle seat.

JP-A-2008-38077 discloses antenna electrodes arranged on a base fabric as an antenna to detect an occupant. The antenna electrode has a loop shape, and a center part of the antenna electrode has an opening open in a vehicle, left-and-right direction.

JP-A-2008-506962 discloses an electrode of an occupant detecting device. The device has a linear-shaped conductive passage extending in a vehicle front-and-rear direction. The conductive passage has T-shaped projections extending to both sides of the electrode.

JP-A-2007-101489 discloses a seat of an occupant detecting device. The seat is divided into two sections in a seat width direction, and is further divided into two sections in a seat front-and-rear direction. Thus, the seat is divided into the four sections. The sections located adjacent to each other in the seat front-and-rear direction are connected with each other through a first elastic portion having a bent shape. The sections located adjacent to each other in the seat width direction are connected with each other through a second elastic portion.

JP-A-2000-65658 discloses a seating sensor made of a film. The seating sensor has a left section and a right section. A clearance is defined between the left section and the right section in a vehicle left-and-right direction, when no occupant is seated on a vehicle seat. The left section and the right section are to be connected with each other, if an occupant is seated on the vehicle seat.

US 2008/0277910 A1 discloses U-shaped film sensors arranged in series. Thus, a vehicle seat is deformable in both of a front-and-rear direction and a left-and-right direction.

Because the opening of the antenna electrode of JP-A-2000-38077 opens in the vehicle left-and-right direction, a vehicle seat can be deformed in a vehicle front-and-rear direction, but the vehicle seat cannot be deformed in the vehicle left-and-right direction.

Because the linear-shaped conductive passage of JP-A-2008-506962 is located to extend in the vehicle front-and-rear direction, a vehicle seat cannot be deformed in the vehicle front-and-rear direction.

In JP-A-2000-38077 or JP-A-2008-506962, the vehicle seat is deformable in a first direction, but is not deformable in a second direction perpendicular to the first direction, because a linear member located in the vehicle seat extends in the second direction. Therefore, it is difficult to raise a comfortableness of the vehicle seat.

Because the vehicle seat of JP-A-2007-101489 is divided into the four sections, the vehicle seat is deformable in the seat width direction and the seat front-and-rear direction. However, because each section does not have an opening, each section is difficult to have a deformation.

Similarly, because each section of JP-A-2000-65658 does not have an opening, each section is difficult to have a deformation.

In JP-A-2007-101489 or JP-A-2000-65658, the vehicle seat has a deformable part, but each section of the vehicle seat is not deformable. Each section has a linear member, and the linear member cannot have a bending in an extending direction of the linear member. Therefore, it is difficult to raise a comfortableness of the vehicle seat.

The vehicle seat of US 2008/0277910 A1 is deformable in both of the front-and-rear direction and the left-and-right direction, due to the U-shaped film sensors arranged in series. However, an electrode arranged in the vehicle seat cannot have a necessary capacitance, because an area of the electrode cannot be made large.

SUMMARY OF THE INVENTION

In view of the foregoing and other problems, it is an object of the present invention to provide a capacitive occupant sensor.

According to an example of the present invention, a capacitive occupant sensor to detect an occupant seated on a vehicle seat includes an electrostatic sensor mat arranged inside of the vehicle seat so as to detect the occupant based on a capacitance variation. The mat includes a plurality of U-parts arranged in a first direction and a second direction approximately perpendicular to each other. The U-part has an opening recessed in the first direction or the second direction. The U-parts located adjacent to each other are connected with each other in the second direction so as to define a S-part, in a manner that the openings alternately open toward a first side of the first direction or a second side of the first direction. The S-part is one of a plurality of S-parts. The S-parts located adjacent to each other are combined with each other in the first direction, in a manner that the opening open toward the first side and the opening open toward the second side oppose to each other in the first direction. The mat has a meandering structure defined by the plurality of S-parts.

Accordingly, a comfortableness of the vehicle seat can be raised.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A first embodiment will be described with reference to FIGS. 1 and 2. A capacitive occupant sensor 1 of the first embodiment is arranged inside of a vehicle seat so as to detect whether an occupant is seated-on the vehicle seat. Further, the sensor 1 detects a kind of the occupant. For example, the sensor 1 detects a child restraint system (CRS) or an adult as the occupant.

Figure 1:
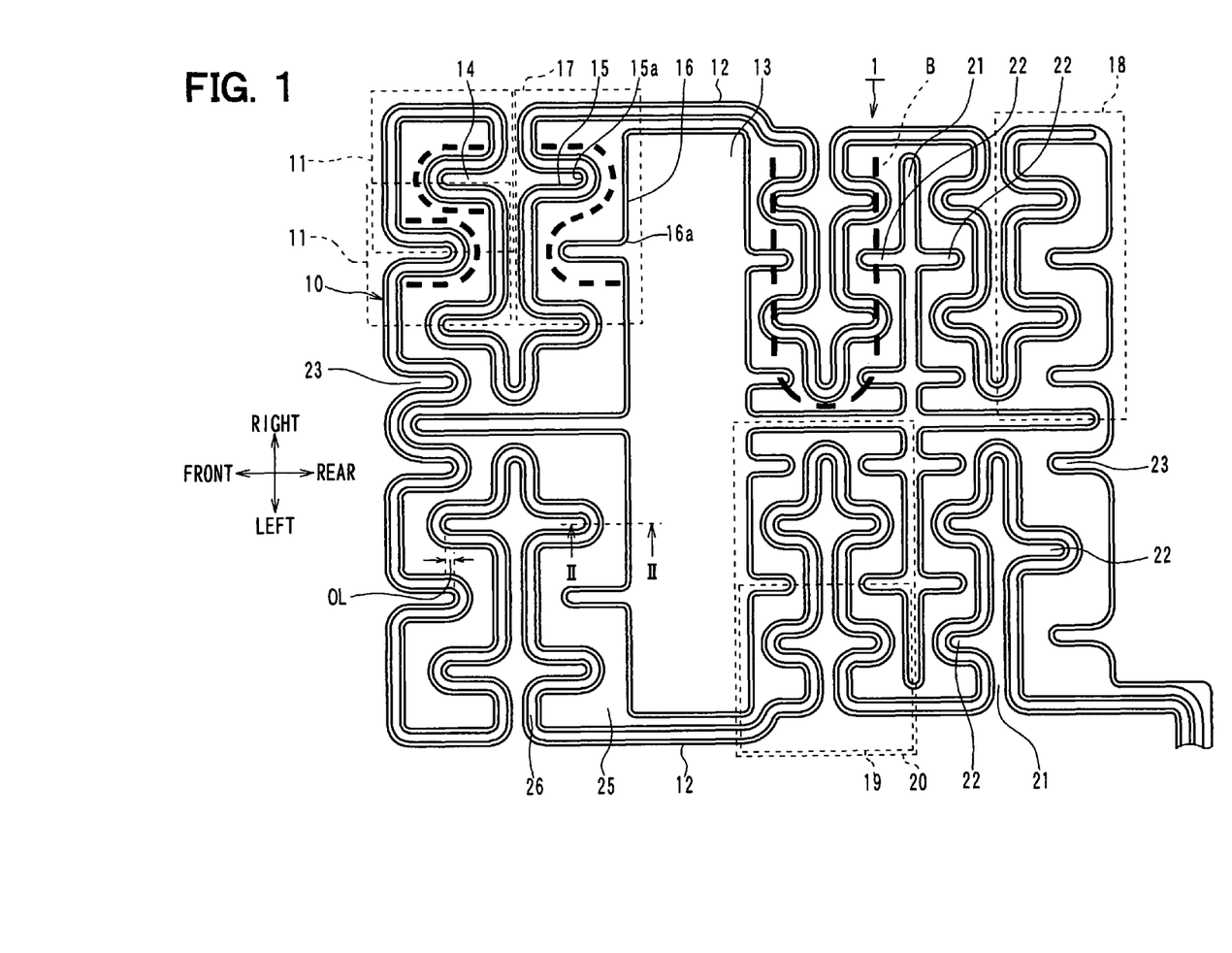
FIG. 1 is a plan view illustrating a sensor mat of a capacitive occupant sensor according to a first embodiment.
Figure 2:
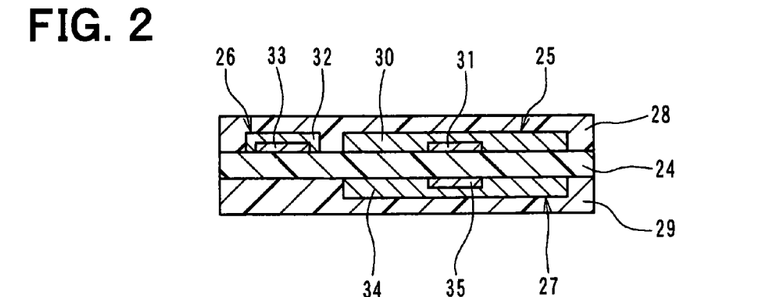
FIG. 2 is a cross-sectional view taken along line II-II of FIG. 1.

As shown in FIG. 1, the sensor 1 includes an electrostatic sensor mat 10.

A plane structure of the sensor mat 10 will be described with reference to FIG. 1. The sensor mat 10 corresponds to an approximately rectangular-shaped seat, and has plural U-parts 11 having U-shape. Further, the sensor mat 10 has a linear portion 12 and a through hole portion 13. The linear portion 12 is located on an outer periphery of the mat 10. The through hole portion 13 is defined to pass through the mat 10, and is surrounded by the plural U-parts 11. The linear portion 12 extends in a vehicle front-and-rear direction. A longitudinal direction of the through hole portion 13 corresponds to a vehicle left-and-right direction approximately perpendicular to the vehicle front-and-rear direction.

The through hole portion 13 separates the mat 10 into a front area and a rear area, and the linear portion 12 is located to connect the front area and the rear area. A dimension of the linear portion 12 is equal to or smaller than a half (½) length of the mat 10 in the front-and-rear direction.

A surface cover of the vehicle seat has a wire, and the wire passes through the through hole portion 13. A left-and-right width of the front area of the mat 10 is larger than that of the rear area of the mat 10. The vehicle seat has a seat bottom, and a left-and-right width of the seat bottom is made larger as the seat bottom extends frontward from a rear side. A shape of the mat 10 corresponds to a shape of the seat bottom of the vehicle seat.

The mat 10 has the plural U-parts 11, and the U-shape of the U-part 11 is constructed by an opening 14. The opening 14 is defined by a recess recessed from the mat 10. The U-shape of the U-part 11 of FIG. 1 is represented by a bold dashed line. Two of the U-parts 11 located adjacent to each other are indicated by two bold dashed lines. Other bold dashed lines of other U-parts 11 are omitted in FIG. 1.

The U-parts 11 of the mat 10 are arranged in both of the front-and-rear direction and the left-and-right direction approximately perpendicular to each other. The opening 14 opens in the front-and-rear direction or in the left-and-right direction. The mat 10 is constructed by a combination of the opening 14 opening in the front-and-rear direction and the opening 14 opening in the left-and-right direction.

A plane size of the U-part 11 is different between the front area and the rear area. The plane size represents a dimension of the U-part 11 in the front-and-rear direction, and a dimension of the U-part 11 in the left-and-right direction. That is, the front-and-rear dimension and/or, the left-and-right dimension of the U-part 11 located in the rear area is smaller than that located in the front area.

As shown in FIG. 1, the U-part 11 has an inner circumference line 15 and an outer circumference line 16 located outside of the inner circumference line 15. The opening 14 is defined by the inner circumference line 15, and an outer shape of the U-part 11 is defined by the outer circumference line 16. That is, a dimension between the inner circumference line 15 and the outer circumference line 16 corresponds to a thickness of U-part 11.

A shape of the inner circumference line 15 may be different from a shape of the outer circumference line 16. At this time, a curvature radius of a curve 16a of the outer circumference line 16 is set smaller than that of a curve 15a of the inner circumference line 15. Therefore, a distance between the curve 15a of the inner circumference line 15 and the curve 16a of the outer circumference line 16 becomes large, compared with a case in which the inner circumference line 15 and the outer circumference line 16 have the same shape. Thus, an area of the U-part 11 becomes large, compared with the case in which the inner circumference line 15 and the outer circumference line 16 have the same shape.

The U-parts 11 having the larger area are arranged in the front area of the vehicle seat. The U-part 11 having the larger area is less flexible than the U-part 11 having the smaller area. When an occupant is seated on the vehicle seat, an upper leg of the occupant is located on the front area of the vehicle seat, and a leg sensitivity is lower than a buttock sensitivity. Therefore, occupant comfortableness is less affected even when the area of the U-part 11 is increased. Further, when an electrode is arranged in the U-part 11, the electrode can be secured to have a larger area without affecting the occupant comfortableness.

As shown in FIG. 1, a S-part 17 is defined by connecting the U-parts 11 located adjacent to each other, in a manner that the openings 14 of the U-parts 11 alternately open in directions opposite from each other. The mat 10 may be defined by combining a plurality of the S-parts 17. Because the size of the U-part 11 is different between the front area and the rear area, a plane size of the S-part 17 located in the front area is larger than that located in the rear area.

A bold dashed line of FIG. 1 having a reverse S-shape represents a S-shape of the S-part 17. Other bold dashed lines of other S-parts 17 are omitted in FIG. 1.

As shown in FIG. 1, one of the U-parts 11 defining the S-part 17 has the opening 14 open frontward, and the other of the U-parts 11 defining the S-part 17 has the opening 14 open rearward. Further, the openings 14 of the S-part 17 has an overlap OL overlapping with each other in the left-and-right direction. Due to the overlap OL of the openings 14, a part of the S-part 17 extending in the left-and-rear direction can be bent in the front-and-rear direction, and a linear section of the S-part 17 extending in the left-and-right direction can be made short. Because the plane structure of the mat 10 has plural curves, a linear section of the mat 10 can be made short.

As shown in a dashed line B of FIG. 1, the S-parts 17 are connected with each other so as define another U-part larger than the U-part 11. The mat 10 may be defined by a plurality of the larger U-parts. The larger U-part represented by the dashed line B is constructed by the S-parts 17 extending parallel with each other in the left-and-right direction. At this time, ends of the S-parts 17 are connected with each other by the U-part 11. Further, the larger U-parts located adjacent to each other are connected in the front-and-rear direction, in a manner that openings of the larger U-parts are alternately open rightward or leftward.

When the larger U-part is constructed by connecting the S-parts 17, the S-part 17 is deformable in the left-and-right direction, and the larger U-part is deformable in the front-and-rear direction. That is, the mat 10 is deformable in both of the left-and-right direction and the front-and-rear direction approximately perpendicular to each other. Thus, the whole of the mat 10 can be deformable.

The mat 10 has a zigzag structure meandering in both of the left-and-right direction and the front-and-rear direction, due to the connected U-parts 11. In the meandering zigzag structure, the opening 14 open frontward and the opening 14 open rearward oppose to each other. For example, when a round-trip S-parts combination is bent in the front-and-rear direction, the U-parts 11 are bent and overlap with each other.

The S-part 17 meandering in a first direction further meanders in a second direction perpendicular to the first direction. Therefore, the whole of the mat 10 becomes flexible, and the mat 10 can have an area sufficient for detecting a capacitance variation. When the mat 10 have the sufficient area, each of a main electrode 25 and a liquid detecting electrode 26 to be described below can be have sufficient area.

The meandering S-parts combination has a turn-around point of the meandering constructed by a single U-part 11. Therefore, a distance between the S-parts combination can be made short, such that the number of the meanderings arranged in a predetermined area can be increased.

In a comparison case, a turn-around point of the meandering is constructed by plural U-parts such as S-part. In this case, the turn-around point is made longer by the number of the U-parts. Further, a distance between the S-parts combination is made large.

However, according to the first embodiment, the turn-around point of the meandering is constructed by the single U-part 11. The length of the turn-around point corresponds to a bent portion dimension of the U-part 11. Therefore, the distance between the S-parts combination can be made small. Thus, the whole of the mat 10 can be flexible, and the mat 10 can have much area in the predetermined area.

An interval between the S-parts combinations is equal to a width of the opening 14, for example, when linear portions of the U-part 11 oppose to each other through the opening 14. That is, the interval is equal to a distance between the inner circumference lines 15 opposing to each other.

As shown in FIG. 1, the mat 10 has a block 18 meandering in the left-and-right direction, when the S-parts 17 are connected in the left-and-right direction. In the block 18, the openings 14 of the U-parts 11 are alternately open frontward or rearward. A plurality of the blocks 18 is arranged parallel with each other in the front-and-rear direction. Further, right ends or left ends of the blocks 18 are alternately connected with each other in the front-and-rear direction. Thus, the mat 10 has a meandering structure meandering in the front-and-rear direction. That is, the block 18 has a zigzag structure, due to a connection constructed by the single U-part 11.

As shown in FIG. 1, the block 18 located most left and rear position is connected to a connector (not shown). The mat 10 is connected to outside by the connector. The position connected to the connector is not limited to an example shown in FIG. 1. For example, the block 18 located most right and rear position may be connected to a connector (not shown).

Thus, the mat 10 has a structure meandering in both of the front-and-rear direction and the left-and-right direction, when the U-parts 11 or the S-parts 17 are connected with each other. The S-part 17 has the openings 14 open in the front-and-rear direction, thereby the S-part 17 is deformable in the left-and-right direction. A block combination defined by connecting the blocks 18 is deformable in the front-and-rear direction.

Because the mat 10 is deformable in both of the front-and-rear direction and the left-and-right direction, flexibility of the mat 10 can be increased.

As shown in FIG. 1, the mat 10 having a structure combining the U-parts 11 or the S-parts 17 may be defined by a first unit 19 and a second unit 20.

Specifically, the first unit 19 is defined by a first U-part having an opening 14 open frontward and a second U-part having an opening 14 open rearward. At this time, the openings 14 of the first U-part and the second U-part oppose to each other. The second unit 20 is defined by arranging the first units 19 in the left-and-right direction. In this case, the mat 10 is defined by arranging the second units 20 in the front-and-rear direction.

The number of the second units 20 located in the rear area is larger than that located in the front area. The upper leg of the occupant is located on the front area, and the buttock of the occupant is located on the rear area, such that the body of the occupant is mainly located on the rear area. Therefore, the occupant can be easily detected by increasing the number of the second units 20 located in the rear area.

The plane structure of the mat 10 is constructed by combinations of the U-parts 11 or the S-parts 17. The U-part 11 or the S-part 17 may be represented by defining a slit or a cutout in the mat 10. The slit may be defined by a notch.

The plane structure of the mat 10 may be defined by a plurality of first slits 21, a plurality of second slits 22 and a plurality of third slits 23, for example. The slit 21, 22, 23 corresponds to a recess recessed toward an inner side from an outer periphery of a predetermined area.

The first slit 21 extends in the left-and-right direction. Specifically, an outer periphery of the mat 10 extending in the front-and-rear direction is recessed in the left-and-right direction, and the recess defines the first silt 21. Further, a slit extending from the through hole portion 13 in the front-and-rear direction has a recess recessed in the left-and-right direction, and the recess defines the first silt 21. The first silt 21 extending leftward and the first slit 21 extending rightward are alternately arranged in the front-and-rear direction.

As shown in FIG. 1, the number of the first slits 21 located in the rear area is larger than that located in the front area. Thus, the rear area of the mat 10 has much slits than the front area of the mat 10, such that the rear area of the mat 10 can be flexible than the front area of the mat 10.

The second slit 22 is branched from the first slit 21, and extends in the front-and-rear direction. The second slit 22 may correspond to the opening 14 of the U-part 11.

An interval between the second slits 22 located adjacent to each other in the rear area is smaller than that in the front area. In this case, the rear area can easily have a deformation than the front area, such that the rear area of the mat 10 can be flexible than the front area of the mat 10.

An outer periphery of the mat 10 extending in the left-and-rear direction has the third slit 23 recessed in the front-and-rear direction. The third slit 23 may correspond to the opening 14 of the U-part 11.

Because the second slit 22 and the third slit 23 correspond to the opening 14 of U-part 11, the second slit 22 and the third slit 23 have the overlap OL overlapping with each other in the left-and-right direction.

When the slits 21, 22, 23 are defined in the mat 10, the mat 10 has the plane structure having the U-parts 11 or the S-parts 17.

The plane structure of the mat 10 may be defined by notches and cutouts. The notch corresponds to a recess recessed from an outer periphery of a predetermined area toward an inner side of the predetermined area. The notch may correspond to a slit. The cutout corresponds to a window portion having an opening defined in the predetermined area.

The mat 10 has a first notch, a second notch, a third notch, a first cutout, and a second cutout.

An outer periphery of the mat 10 extending in the left-and-rear direction has the first notch recessed in the front-and-rear direction. An outer periphery of the mat 10 extending in the front-and-rear direction has the second notch recessed in the left-and-rear direction. The second notch further has a recess recessed in the front-and-rear direction, and the recess defines the third notch.

The first notch corresponds to the third slit 23. The second notch corresponds to the first slit 21 recessed in the left-and-right direction. The third notch corresponds to the second slit 22 branched from the first slit 21.

The first cutout and the second cutout are defined in the mat 10. The first cutout extends in the front-and-rear direction, and the second cutout extends in the left-and-right direction. The second cutout corresponds to the first slit 21 recessed in the left-and-right direction from a slit extending from the through hole portion 13 in the front-and-rear direction. The first cutout corresponds to the second slit 22 branched from the first slit 21.

The first cutout and the second cutout are defined by a single cutout defined in the mat 10. The mat 10 has a single closed area corresponding to the window portion. A line surrounding the closed area defines shapes of the first cutout and the second cutout. The through hole portion 13 may correspond to one of the second cutouts.

The second notch and the second cutout are alternately located in the front-and-rear direction. The first notch and the third notch are alternately located in the left-and-right direction. The third notch and the first cutout are located between the second notch and the second cutout in the front-and-rear direction, and are alternately in the left-and-right direction. Due to position arrangements of the notches and the cutouts, the mat 10 has the plane structure constructed by the U-parts 11.

At least a part of the U-parts 11 or the S-parts 17 is symmetrically located relative to an imaginary centerline of the mat 10 extending in the front-and-rear direction. Therefore, occupant comfortableness of the mat 10 can be made approximately the same between a left area and a right area, such that an occupant can be more comfortably seated on the mat 10.

A cross-section structure of the mat 10 will be described with reference to FIG. 2. The mat 10 has a main film 24, a main electrode 25, a liquid detecting electrode 26, a guard electrode 27, a cover film 28 and a resist coat 29.

The films 24, 28 and the resist coat 29 have flat shape, and are made of electrical insulation material such as polyethylene terephthalate (PET). The films 24, 28 and the resist coat 29 are bonded with each other through an adhesive (not shown). The plane structure of the mat 10 corresponds to a plane structure of the main film 24, for example.

The main electrode 25 is used for determining whether an occupant is seated on the vehicle seat. The main electrode 25 has a carbon electrode 30 and a silver electrode 31. The main electrode 25 is arranged between the main film 24 and the cover film 28. The carbon electrode 30 is a flat electrode, and the silver electrode 31 corresponds to a wiring. A width of the silver electrode 31 is smaller than that of the carbon electrode 30. The silver electrode 31 is covered by the carbon electrode 30.

The main electrode 25 has a plane structure corresponding to that of the mat 10. That is, the plane structure of the main electrode 25 corresponds to that of the main film 24, for example. The main electrode 25 is formed along the curve 16a of the outer circumference line 16. Due to the curve 16a, the area of the U-part 11 is increased, such that an area of the main electrode 25 is increased.

The liquid detecting electrode 26 is a sub electrode used for determining whether the vehicle seat contains liquid. The liquid detecting electrode 26 has a carbon electrode 32 and a silver electrode 33. The liquid detecting electrode 26 is arranged between the main film 24 and the cover film 28. A function of the carbon electrode 32 corresponds to that of the carbon electrode 30, and a function of the silver electrode 33 corresponds to that of the silver electrode 31. A width of the silver electrode 33 is smaller than that of the carbon electrode 32. The silver electrode 33 is covered by the carbon electrode 32. The liquid detecting electrode 26 is located to be distanced from the main electrode 25. The main electrode 25 and the liquid detecting electrode 26 are located adjacent to each other.

Figure 3A:
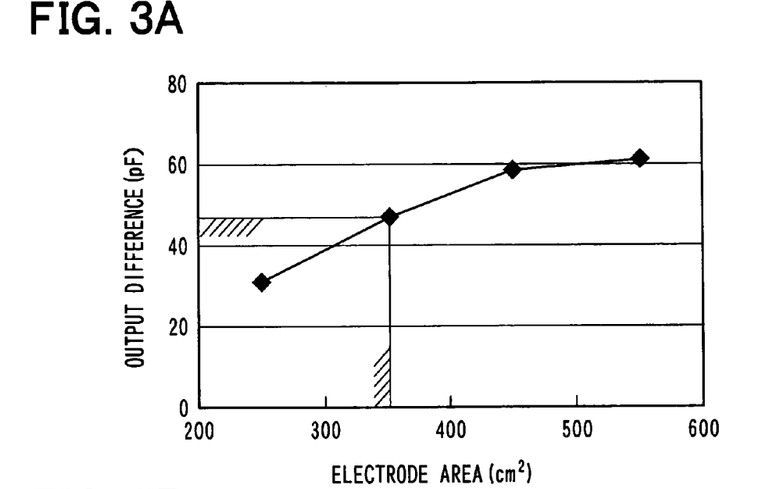
FIG. 3A is a graph illustrating a relationship between an output difference and an electrode area.

FIG. 3A is a graph illustrating a relationship between an output difference (pF) and an electrode area (cm2). The output difference represents a difference between a capacitance output when a child restraint system (CRS) is arranged on the vehicle seat and a capacitance output when an adult is seated on the vehicle seat. The difference is necessary for distinguishing the CRS and the adult from each other. The electrode area represents an electrode area size of the mat 10.

Figure 3B:
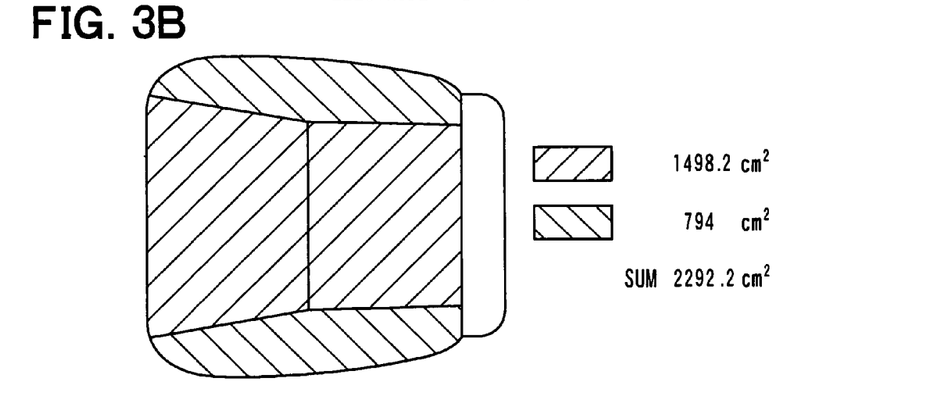
FIG. 3B is a plan view illustrating a vehicle seat having the capacitive occupant sensor.

As shown in FIG. 3A, the output difference equal to or larger than 48 pF is necessary for distinguishing a one-year-old child seated on the CRS and an adult, thereby an electrode area equal to or larger than 350 cm$^2$ is necessary. In this case, if a seat bottom of the vehicle seat has a total area of 2292 cm$^2$, as shown in FIG. 3B, a ratio of the electrode area to the seat bottom area is necessary to be equal to or larger than 15%, based on a calculation of 350/2292=0.15.

In the mat 10 of FIG. 1, the main electrode 25 has an area of 400 cm$^2$, and the liquid detecting electrode 26 has an area of 150 cm$^2$, for example. If the main electrode 25 is unable to meet the necessary area, the liquid detecting electrode 26 may be used for occupant determination so as to secure the necessary area.

When the guard electrode 27 is made to have the same electric potential as the main electrode 25, a capacitance between a seat frame and the main electrode 25 is cancelled. The guard electrode 27 has a carbon electrode 34 and a silver electrode 35. A function of the carbon electrode 34 corresponds to that of the carbon electrode 32, and a function of the silver electrode 35 corresponds to that of the silver electrode 33. The guard electrode 27 is arranged between the main film 24 and the resist coat 29 so as to oppose to the main electrode 25. The main electrode 25 and the guard electrode 27 are separated and insulated from each other by the main film 24.

The liquid detecting electrode 26 is located adjacent to the inner circumference line 15 of the U-part 11, and the main electrode 25 is located adjacent to the outer circumference line 16 of the U-part 11. As for the U-part 11 located most front side, the main electrode 25 is arranged between the electrode 26 located adjacent to the inner circumference line 15 and the electrode 26 located adjacent to the outer circumference line 16.

The electrode 25, 26, 27 is connected to a connector (not shown), and is electrically connected to an electric circuit through the connector. The sensor 1 has an electric circuit (not shown) to supply an alternate power for the electrode 25, 26, 27 of the mat 10. The sensor 1 can perform occupant determination and liquid determination, due to the electric circuit.

Specifically, an alternate voltage is applied to the main electrode 25, such that an electric field is generated between the main electrode 25 and a vehicle chassis. Further, an alternate voltage is applied to the guard electrode 27, such that the main electrode 25 and the guard electrode 27 have the same electric potential. Similarly to the main electrode 25, an alternate voltage is applied to the liquid detecting electrode 26.

When the vehicle seat is vacant, air is mainly located between the main electrode 25 and the vehicle chassis. When an occupant is seated on the vehicle seat, a human body of the occupant is located between the main electrode 25 and the vehicle chassis. At this time, a capacitance between the main electrode 25 and the vehicle chassis is varied compared with a case in which the vehicle seat is vacant. Whether an occupant is seated or not can be detected by detecting the capacitance.

Because the area of the U-part 11 is increased, an adequate area of the main electrode 25 of the mat 10 can be secured. Therefore, occupant detecting accuracy can be maintained even if the mat 10 is constructed by the U-parts 11.

An electric field is formed between the guard electrode 27 and the seat frame, when nothing is located on the vehicle seat. The guard electrode 27 is located between the main electrode 25 and the seat frame so as to have the same potential as the main electrode 25. Therefore, a capacitance between the main electrode 25 and the seat frame is cancelled, when, the vehicle seat is vacant. Thus, influence of the seat frame can be reduced relative to the main electrode 25.

An electric field is formed between the main electrode 25 and the liquid detecting electrode 26. When liquid such as pure water or saline solution is located between the main electrode 25 and the liquid detecting electrode 26, capacitance and resistance between the electrodes 25, 26 are varied. Whether the vehicle seat contains liquid or not can be detected by detecting the variation.

Construction and operation of the sensor 1 of the first embodiment have been described.

The capacitive occupant sensor 1 has a urethane pad 40, and the electrostatic sensor mat 10 is bonded to the urethane pad 40. The urethane pad 40 will be described with reference to FIG. 4.

Figure 4:
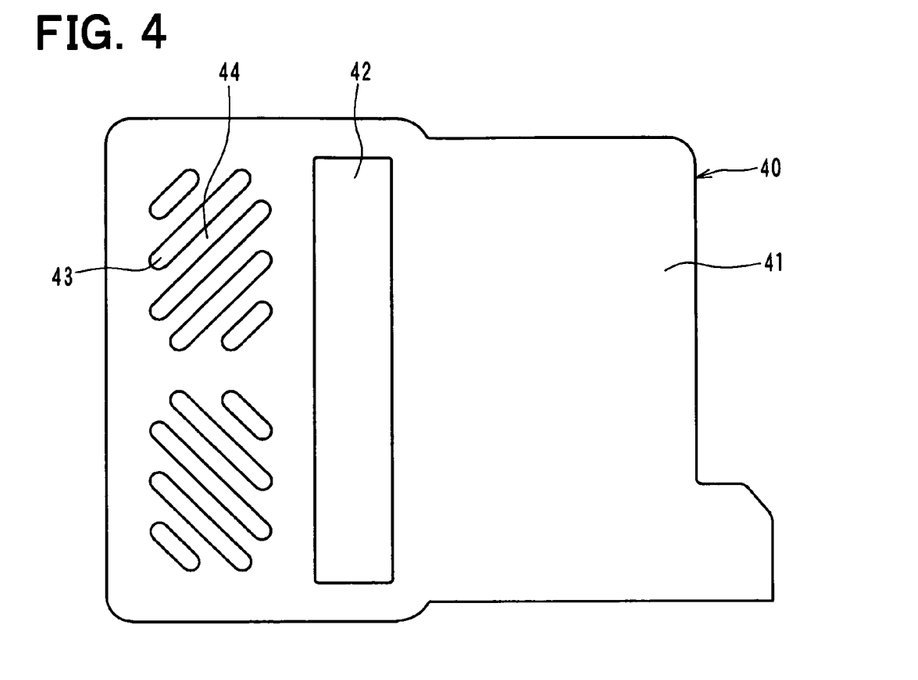
FIG. 4 is a plan view illustrating a urethane pad of the capacitive occupant sensor.

As shown in FIG. 4, the urethane pad 40 has a seat shape, and has a first face 41 to which the mat 10 is bonded. A plane size of the first face 41 of the urethane pad 40 is larger than that of the mat 10.

The urethane pad 40 further has a communication hole portion 42 and an electrical connection opening 43. The communication hole portion 42 is a penetration hole communicating with the through hole portion 13 of the electrostatic sensor mat 10. The wire of the surface cover of the vehicle seat passes through the communication hole portion 42, similarly to the through hole portion 13.

The electrical connection opening 43 penetrates the urethane pad 40, and is located in a front area of the pad 40. Since multiple sealed air element are located inside of the urethane pad 40, heat conductivity of the urethane pad 40 is low. However, the pad 40 easily has heat conduction from a first face to a second face, due to the electrical connection opening 43.

The urethane pad 40 has a connection part 44 connecting edges of the electrical connection openings 43. If the U-part 11 is located on the electrical connection opening 43, the connection part 44 disables the U-parts 11 to be separated from each other. Therefore, the electrical connection openings 43 are defined in the urethane pad 40.

Figure 5:
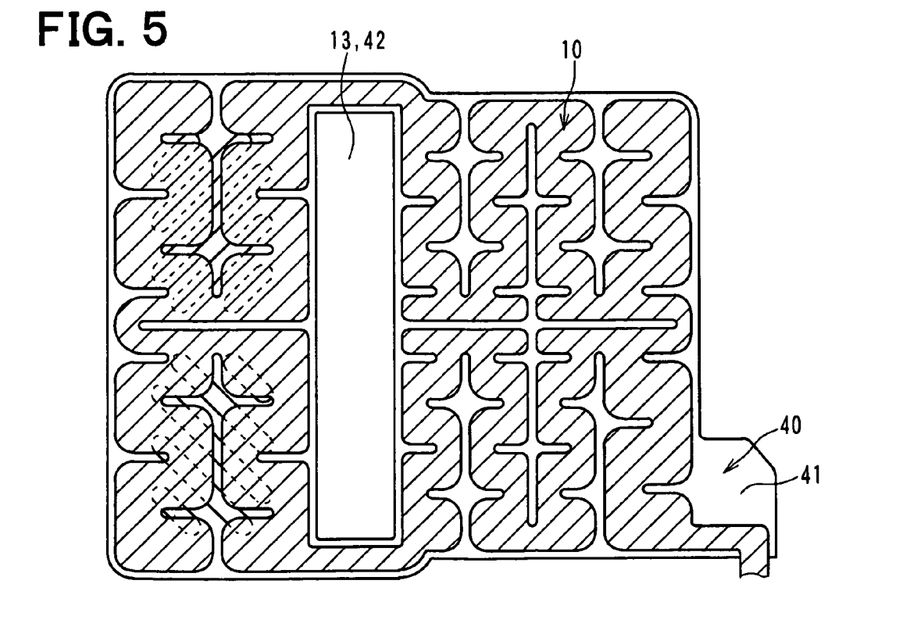
FIG. 5 is a plan view illustrating the sensor mat arranged on the urethane pad.

FIG. 5 is a plan view illustrating the sensor mat 10 bonded to the first face 41 of the urethane pad 40. A hatching area of FIG. 5 represents the electrostatic sensor mat 10.

As shown in FIG. 5, the mat 10 is fixed on the first face 41 of the urethane pad 40, in a manner that the through hole portion 13 and the communication hole portion 42 are connected with each other. Due to the fixing, the U-parts 11 of the mat 10 can be combined. That is, a shape of the electrostatic sensor mat 10 can be maintained. Further, the mat 10 can be easily handled, because the mat 10 is fixed on the pad 40.

A position of the electrical connection opening 43 is set in a manner that at least a part of the electrical connection opening 43 communicates with the opening 14 of U-part 11. Therefore, when a layered member is defined by layering the mat 10 and the pad 40, the layered member has a through hole penetrating in the layered member.

Figure 6A:
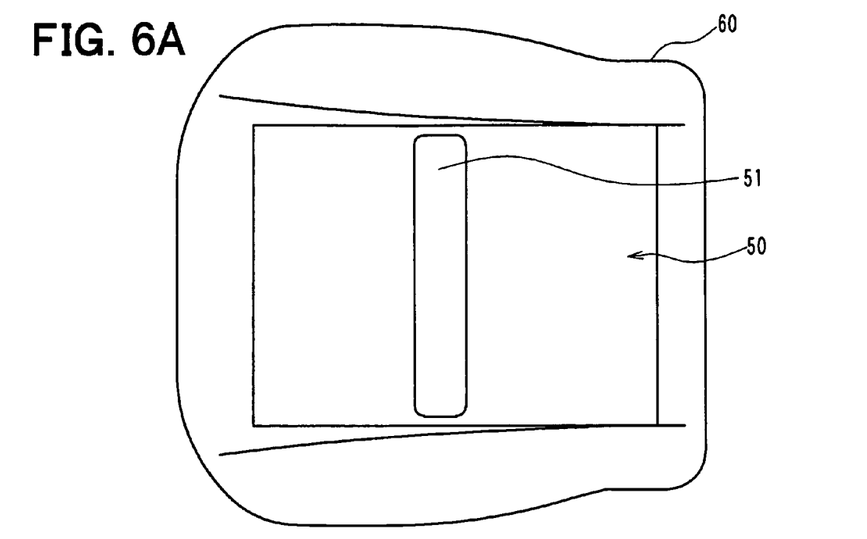
FIG. 6A is a plan view illustrating a seat cushion and a seat heater of the vehicle seat.
Figure 6B:
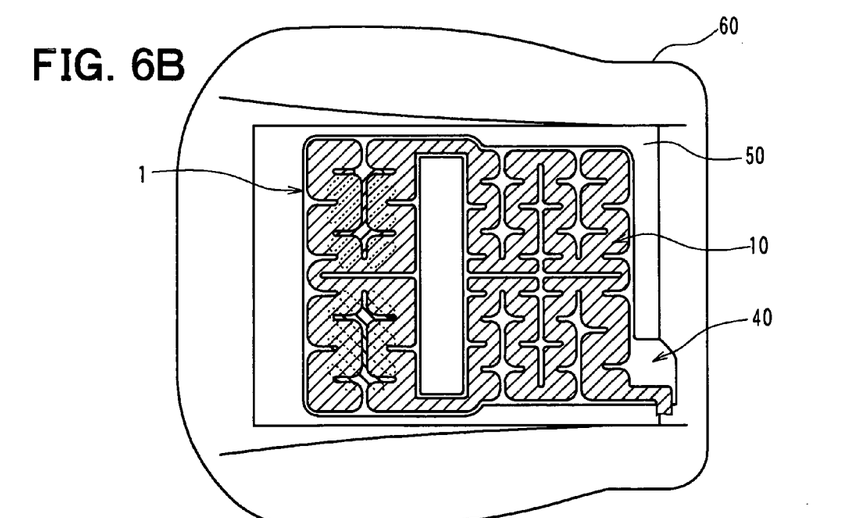
FIG. 6B is a plan view illustrating the urethane pad and the sensor mat arranged on the seat heater.
Figure 6C:
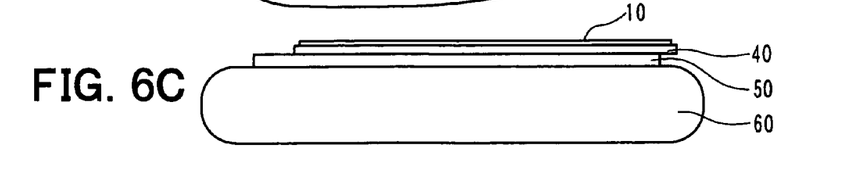
FIG. 6C is a side view illustrating the vehicle seat.

The layered member of FIG. 5 is mounted on the vehicle seat. The mounting will be described with reference to FIGS. 6A, 6B and 6C. FIG. 6A shows a seat cushion 60 having a seat heater 50. FIG. 6B shows the pad 40 and the mat 10 layered on the seat heater 50. FIG. 6C shows a side view of the vehicle seat. The seat heater 50 corresponds to a heating portion. A hatching area of FIG. 6B indicates the mat 10.

As shown in FIG. 6A, the seat heater 50 is arranged on the seat cushion 60, as a heating instrument. The seat heater 50 has a through hole portion 51 through which the wiring of the surface cover of the vehicle seat passes, similarly to the through hole portion 13 and the communication hole portion 42.

As shown in FIGS. 6B and 6C, the pad 40 is arranged on the seat heater 50, and the mat 10 is bonded to the first face 41 of the pad 40. Thus, the vehicle seat has a layered construction.

The urethane pad 40 has the electrical connection opening 43 enabling the pad 40 to have heat conduction. Therefore, heat emitted from the seat heater 50 is transmitted to the mat 10 through the opening 43. Thus, heating effect of the seat heater 50 is not affected by the pad 40.

The electrical connection opening 43 is located at a position corresponding to the upper leg of the occupant seated on the mat 10. Because the leg has less fat than the buttock, warmness can be easily sensed by the leg than the buttock, due to heat-sensing effect of human body.

Therefore, heat emitted from the seat heater 50 can be easily transmitted to the occupant. Further, because at least a part of the electrical connection opening 43 of the pad 40 communicates with the opening 14, heat transmission from the heater 50 is not affected by the mat 10.

The surface cover is arranged on the layered member of FIG. 6C. The wiring of the surface cover passes through the through hole portion 13, the communication hole portion 42 and the through hole portion 51, and is fixed inside of the vehicle seat.

An occupant is to be seated on a structure of FIG. 6C. In a comparison example, a mat has a linear member, and the linear member cannot have a deformation in an extending direction of the linear member. In this case, occupant comfortableness is low, even if a soft cushion is arranged in the vehicle seat.

According to the first embodiment, the mat 10 is constructed by the plural U-parts 11, and the U-parts 11 located adjacent to each other are connected with each other so as to form the S-part 17. A linear member of the mat 10 corresponds to only a connection between the U-parts 11 and a curve portion of the U-part 11. Therefore, the linear member of the mat 10 is less felt by the occupant. In other words, the linear member is intermittently arranged in the electrostatic sensor mat 10.

The linear portion 12 of the mat 10 has a length equal to or smaller than a half (½) of the whole length of the mat 10 in the front-and-rear direction, such that the mat 10 can be easily deformable.

When the U-part 11 or the S-part 17 is deformed, the size of the opening 14 becomes large. Therefore, when a load is applied to the mat 10, the U-part 11 or the S-part 17 has a deformation extending in a plane direction of the mat 10. Thus, the mat 10 can be easily distorted. Accordingly, occupant comfortableness can be raised.

Due to the U-part 11 and the S-part 17, a linear member of the mat 10 is short compared with the whole length of the mat 10, in the front-and-rear direction and the left-and-right direction. The whole of the mat 10 easily has a deformation in the front-and-rear direction and the left-and-right direction, due to the deformations of the U-part 11 and the S-part 17 in the front-and-rear direction and the left-and-right direction. Thus, the mat 10 becomes flexible. When an occupant is seated on the vehicle seat, the vehicle seat is easily deformable. Thus, occupant comfortableness can be raised.

Due to the U-parts 11 and the S-parts 17, the mat 10 has a layout meandering in both of the front-and-rear direction and the left-and-right direction. Therefore, the mat 10 can easily extend in both of the front-and-rear direction and the left-and-right direction. Therefore, when an occupant is seated on the vehicle seat, the mat 10 is deformable in both of the front-and-rear direction and the left-and-right direction. Thus, the occupant does not feel sense of incongruity for the vehicle seat.

The size of the U-part 11 is different between the front area and the rear area. The buttock of the occupant is located on the rear area of the mat 10. In this case, a large load is applied to the rear area of the mat 10. Because the size of the U-part located in the rear area is smaller than that in the front area, the number of the U-parts 11 located in the rear area is larger than that located in the front area. Therefore, the rear area of the mat 10 is easily deformable. The sense of incongruity is not given to the occupant, and seating comfortableness can be raised.

The mat 10 is bonded to the first face 41 of the pad 40. An elasticity of the pad 40 is lower than that of the seat heater 50 or the seat cushion 60, such that the pad 40 can be easily deformed. Therefore, the mat 10 bonded to the pad 40 can easily have an elastic deformation, compared with a case in which a mat is directly bonded to a heater or a cushion. Due to the pad 40, the shape of the mat 10 can be maintained, and the U-part 11 easily has an elastic deformation. Thus, occupant comfortableness can be further raised.

According to the first embodiment, the plane structure of the mat 10 is defined by combining the plural U-parts 11 and the plural S-parts 17. Therefore, the linear members are not successively arranged in the mat 10 in the front-and-rear direction or the left-and-right direction. The mat 10 is deformable in both of the front-and-rear direction and the left-and-right direction approximately perpendicular to each other. Thus, the whole of the mat 10 becomes flexible, and the seating comfortableness of the mat 10 can be improved. Because the S-part combination defined by connecting the S-parts 17 has the zigzag shape, the whole of the mat 10 can be flexible. Further, the main electrode 25 of the mat 10 can have an area sufficient for detecting a capacitance variation, even if an area of the vehicle seat is limited.

The vehicle front-and-rear direction may correspond to a first direction, and the vehicle left-and-right direction may correspond to a second direction. The front area may correspond to an area located on a first side of the first direction, and the rear area may correspond to an area located on a second side of the first direction. The right side may correspond to a first side of the second direction, and the left side may correspond to a second side of the second direction. The linear portion 12 may correspond to an enclosure portion.

Second Embodiment

Figure 7:
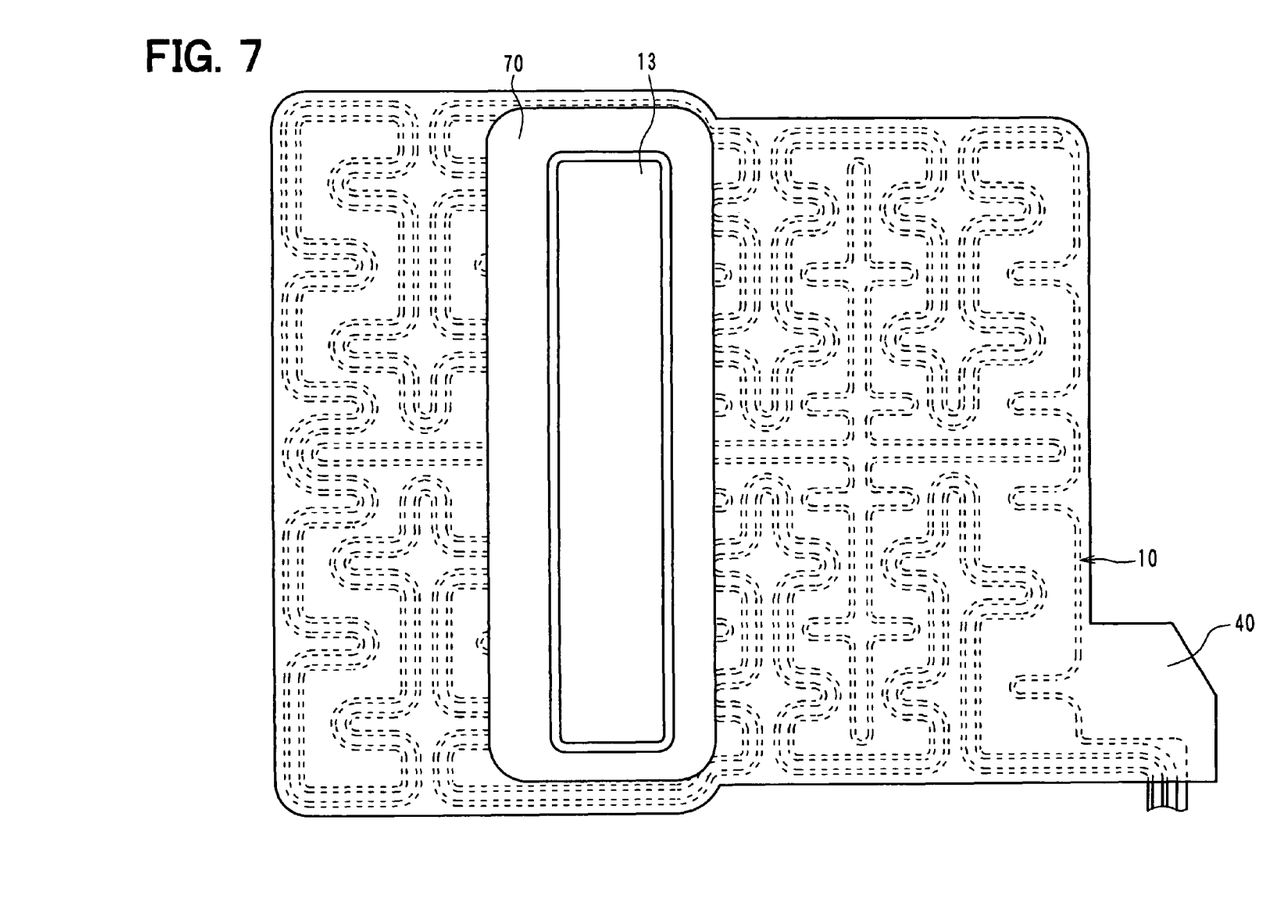
FIG. 7 is a plan view illustrating a capacitive occupant sensor according to a second embodiment.

Points of a second embodiment different from the first embodiment will be described with reference to FIG. 7. As shown in FIG. 7, a urethane pad 40 has a second face opposite from a first face 41 to which a sensor mat 10 is bonded. A seat-shaped adhesive 70 is arranged on the second face of the pad 40 so as to surround a part corresponding to a through hole portion 13 of the mat 10. The adhesive 70 arranged on the second face of the pad 40 surrounds the through hole portion 13.

The adhesive 70 is a double-sided adhesion tape for bonding the electrostatic sensor mat 10 and the seat cushion 60. The mat 10 is bonded to an upper face of the seat cushion 60 by the adhesive 70. Therefore, positioning deviation between the mat 10 and the cushion 60 can be reduced, even if an occupant is repeatedly seated on the vehicle seat.

The adhesive 70 has a ring-shaped layout to surround the through hole portion 13 of the mat 10. The adhesive 70 has a window portion communicating with the through hole portion 13 of the mat 10 and the communication hole portion 42 of the pad 40. The wiring of the surface cover of the vehicle seat passes through the window portion of the adhesive 70.

Because the adhesive 70 has a shape surrounding the through hole portion 13, the adhesive 70 is located on both of a front side and a rear side of the through hole portion 13. Therefore, the mat 10 can be fixed on the cushion 60 on both of the front side and the rear side at the same time. Thus, the mat 10 can be easily bonded to the cushion 60, even if the mat 10 is divided into the front area and the rear area through the through hole portion 13. In this case, the adhesive 70 does not restrict the U-part 11 of the mat 10 from, having deformation, because the adhesive 70 is located only to surround the through hole portion 13.

Thus, due to the adhesive 70, the mat 10 can be bonded to the upper face of the cushion 60 without affecting the deformation of the mat 10.

Other Embodiment

Figure 8:
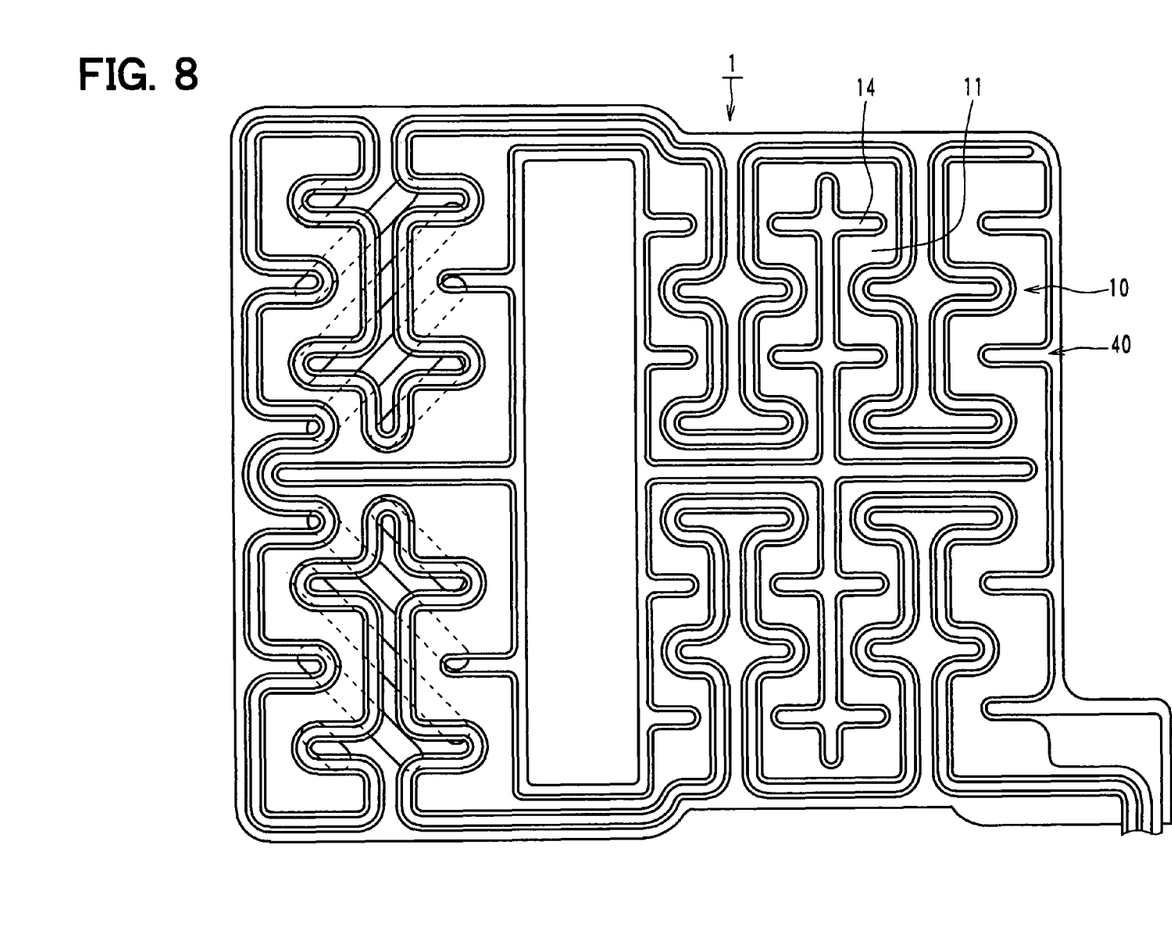
FIG. 8 is a plan view illustrating a capacitive occupant sensor according to other embodiment.
Figure 9:
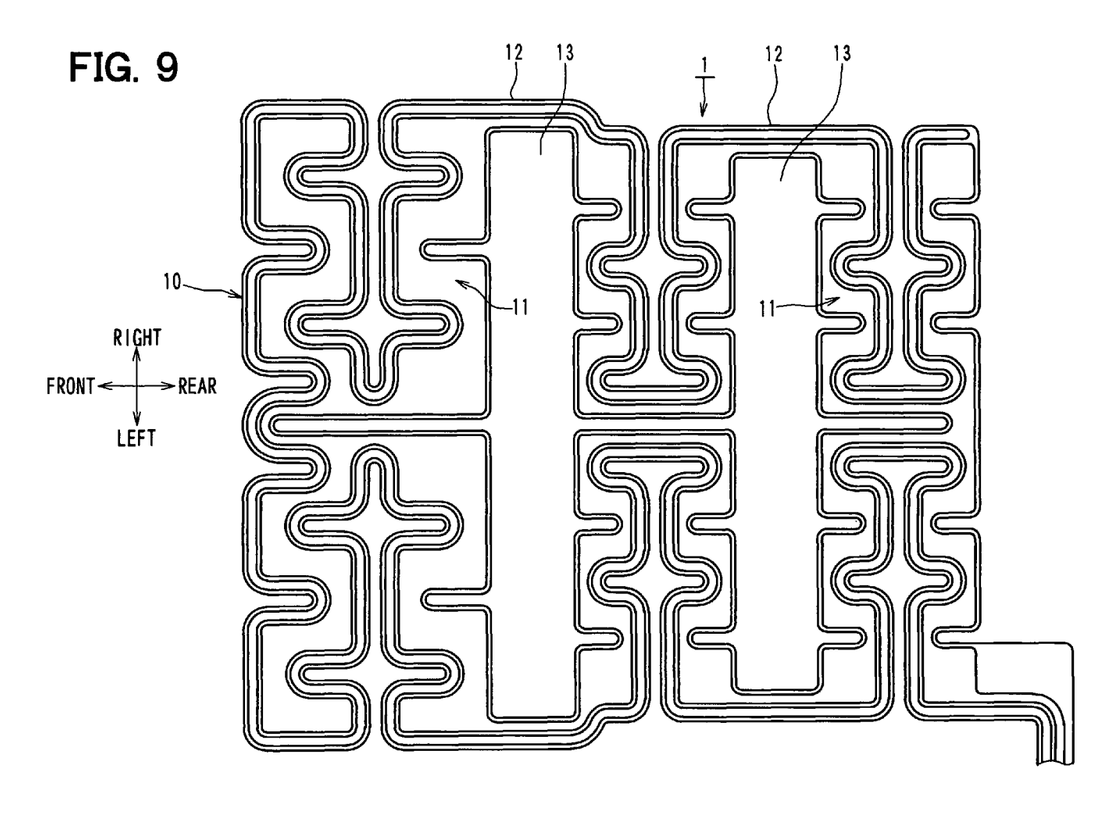
FIG. 9 is a plan view illustrating a capacitive occupant sensor according to other embodiment.
Figure 10:
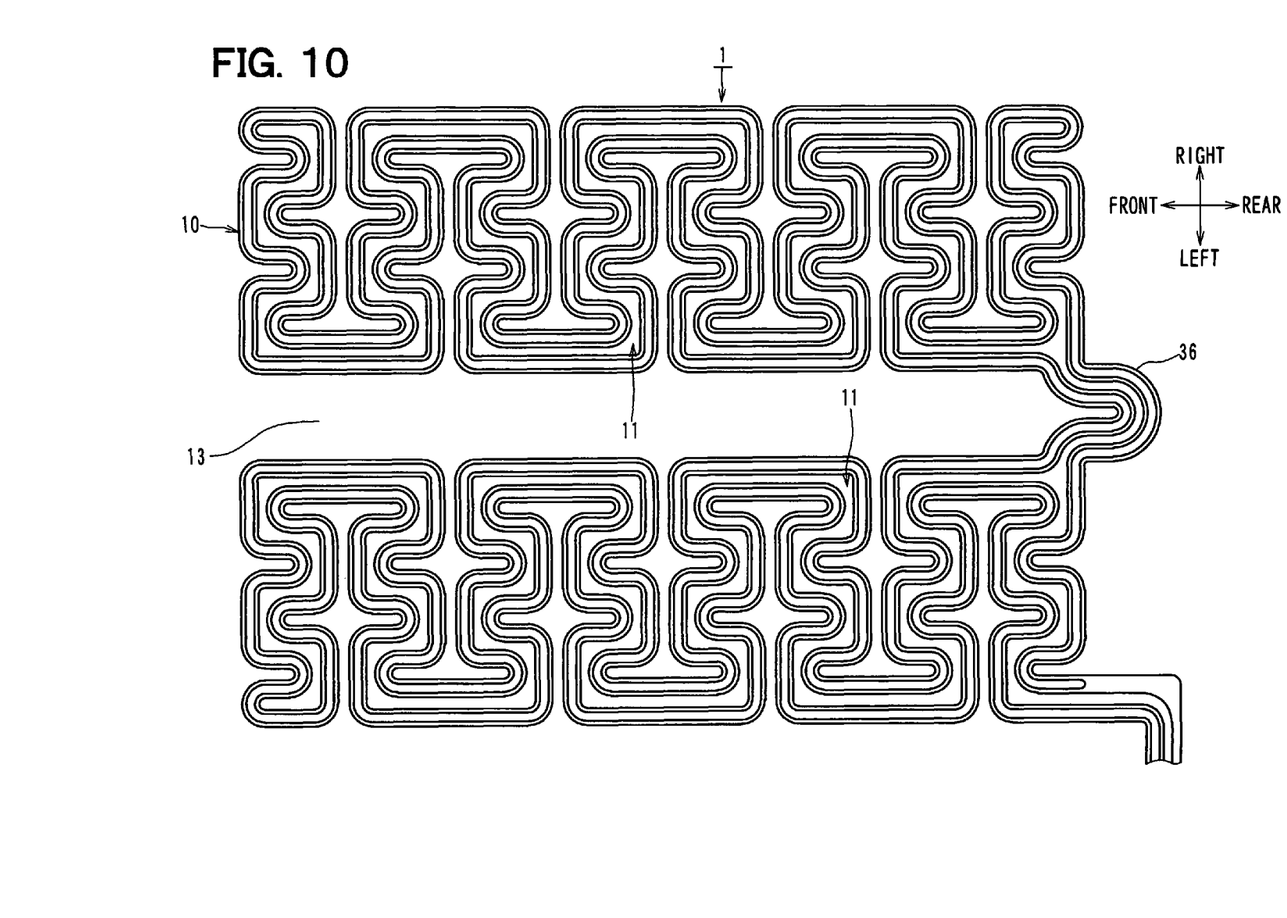
FIG. 10 is a plan view illustrating a capacitive occupant sensor according to other embodiment.

The layout of the mat 10 is not limited to the above example. For example, as shown in FIGS. 8, 9 and 10, the mat 10 may have a layout different from FIG. 1. As shown in FIG. 8, a part of the electrical connection opening 43 of the urethane pad 40 can communicate with the opening 14 of the U-part 11.

As shown in FIG. 9, the electrostatic sensor mat 10 has a plurality of the through hole portions 13 passing through the electrostatic sensor mat 10. Specifically, two of the through hole portions 13 are defined in the electrostatic sensor mat 10 of FIG. 9. The through hole portion 13 is necessary for fixing the surface cover of the vehicle seat. Two of the through hole portions 13 extending in the left-and-right direction are arranged in the front-and-rear direction.

The through hole portion 13 is surrounded by the linear portion 12 extending on the periphery of the mat 10 in the front-and-rear direction, and the U-parts 11 arranged in the left-and-right direction. The through hole portion 13 extends in the left-and-right direction, and two of the through hole portions 13 are arranged in the front-and-rear direction. The number of the through hole portions 13 is not limited to two. The mat 10 may have three or more through hole portions 13.

As shown in FIG. 10, the mat 10 has a through hole portion 13 extending in the front-and-rear direction, different from FIGS. 1, 8 and 9. In this case, the wiring necessary for fixing the surface cover is located at a center part of the vehicle seat and extends in the front-and-rear direction. The mat 10 has a connecting portion 36 located on an outer periphery of the mat 10. The through hole portion 13 penetrating the mat 10 is surrounded by the connecting portion 36 extending on the outer periphery of the mat 10 in the left-and-right direction, and the U-parts 11 arranged in the front-and-rear direction. The connecting portion 36 is located at most rear side of the mat 10 so as to connect a right area of the mat 10 and a left side area of the mat 10. In other words, the through hole portion 13 of FIG. 10 separates the electrostatic sensor mat 10 into two area in the left-and-right direction.

The through hole portion 13 opens frontward in FIG. 10. Alternatively, the through hole portion 13 may be closed by the connecting portions 36 arranged on both of the front side and the rear side and the U-parts 11 arranged in the front-and-rear direction. Further, the mat 10 may have two or more through hole portions 13 extending in the front-and-rear direction. The connecting portion 36 may correspond to an enclosure portion.

The shape of the opening 14 of the U-part 11 is not limited to an example shown in FIG. 1, 8, 9 or 10. The size of the U-part 11 and the size of the S-part 17 are not limited to the above description.

Such changes and modifications are to be understood as being within the scope of the present invention as defined by the appended claims.

What is claimed is:

1. A capacitive occupant sensor comprising an electrostatic sensor mat arranged inside of a vehicle seat and detecting existence or kind of an occupant seated on the vehicle seat based on a capacitance variation of the electrostatic sensor mat, wherein
the mat includes a plurality of U-shaped U-parts arranged in a first direction and a second direction approximately perpendicular to each other,
each of the U-parts has an opening defined by a part of the mat recessed in the first direction or the second direction,
the U-parts located adjacent to each other are connected with each other in the second direction so as to define a S-shaped S-part, in a manner that the openings alternately open toward a first side of the first direction or a second side of the first direction,
the S-part is one of a plurality of S-parts,
the S-parts located adjacent to each other are combined with each other in the first direction, in a manner that the opening open toward the first side and the opening open toward the second side oppose to each other in the first direction, and
the mat has a meandering structure defined by the plurality of S-parts.

2. The capacitive occupant sensor according to claim 1, wherein
the meandering structure defined by the plurality of S-parts has a returning point, and
the returning point is defined by a single U-part.

3. The capacitive occupant sensor according to claim 1, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction,
the mat has a first area located on the first side of the through hole portion in the first direction, and a second area located on the second side of the through hole portion in the first direction, and
at least one of a width of a U-part parallel with the first direction and a width of U-part parallel with the second direction located in the second area is smaller than that located in the first area.

4. The capacitive occupant sensor according to claim 1, wherein
each of the U-parts has an inner circumference line and an outer circumference line located on an outer side of the inner circumference line,
the outer circumference line has a first curve,
the inner circumference line has a second curve, and
the first curve has a curvature radius smaller than that of the second curve.

5. The capacitive occupant sensor according to claim 1, wherein
the opening of one of the U-parts defining the S-part opposes to the first side of the first direction, and the opening of the other of the U-parts defining the S-part opposes to the second side of the first direction, and
the opening open toward the first side of the first direction and the opening open toward the second side of the first direction have an overlap part overlapping with each other in the second direction.

6. The capacitive occupant sensor according to claim 1, wherein
the mat is constructed by a connection between a part of the S-parts and a large U-shaped portion which is larger than each of the U-parts.

7. The capacitive occupant sensor according to claim 1, wherein
the opening of one of the U-parts defining the S-part opposes to the first side of the first direction, and the opening of the other of the U-parts defining the S-part opposes to the second side of the first direction,
the S-parts are connected with each other in the second direction so as to define a block meandering in the second direction,
the block is one of a plurality of blocks arranged in the first direction,
the blocks located adjacent to each other are connected with each other through a first connection or a second connection,
the first connection is defined by first ends of the blocks in the second direction,
the second connection is defined by second ends of the blocks in the second direction,
the first connection and the second connection are alternately located in the first direction, and
the blocks connected with each other in the first direction meanders in the first direction.

8. The capacitive occupant sensor according to claim 1, wherein
the U-parts are located adjacent to each other in the first direction so as to define a first unit, in a manner that the opening open toward the first side of the first direction and the opening open toward the second side of the first direction oppose to each other,
the first unit is one of a plurality of first units,
the plurality of first units is arranged in the second direction so as to define a second unit,
the second unit is one of a plurality of second units, and
the mat is defined by the plurality of second units arranged in the first direction.

9. The capacitive occupant sensor according to claim 8, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction,
the mat has a first area located on the first side of the through hole portion in the first direction, and a second area located on the second side of the through hole portion in the first direction, and
the number of the second units arranged in the second area is larger than the number of the second units arranged in the first area.

10. The capacitive occupant sensor according to claim 1, wherein
the mat has
a first slit extending in the second direction,
a second slit branched from the first slit so as to extend in the first direction, and
a third slit recessed in the first direction from an outer periphery of the mat extending in the second direction,
the third slit corresponds to the opening, and
the plurality of U-parts is defined by the first slit, the second slit and the third slit.

11. The capacitive occupant sensor according to claim 10, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction,
the mat has a first area located on the first side of the through hole portion in the first direction, and a second area located on the second side of the through hole portion in the first direction, and
the number of the first slits located in the second area is larger than the number of the first slits located in the first area.

12. The capacitive occupant sensor according to claim 10, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction,
the mat has a first area located on the first side of the through hole portion in the first direction, and a second area located on the second side of the through hole portion in the first direction,
the first area has a first interval defined between the second slits located adjacent to each other,
the second area has a second interval defined between the second slits located adjacent to each other, and
the second interval is smaller than the first interval.

13. The capacitive occupant sensor according to claim 1, wherein
the mat has
a first notch recessed in the first direction from an outer periphery of the mat extending in the second direction,
a second notch recessed in the second direction from an outer periphery of the mat extending in the first direction,
a third notch recessed in the first direction from the second notch,
a first cutout extending in the first direction inside of the mat, and
a second cutout extending in the second direction inside of the mat,
the second notch and the second cutout are alternately located in the first direction,
the first notch and the third notch are alternately located in the second direction,
the third notch and the first cutout are alternately located in the second direction,
the third notch and the first cutout are located between the second notch and the second cutout in the first direction, and
the plurality of U-parts is defined by the first notch, the second notch, the third notch, the first cutout and the second cutout.

14. The capacitive occupant sensor according to claim 13, wherein
the first cutout and the second cutout are defined by a single cutout located inside of the mat.

15. The capacitive occupant sensor according to claim 1, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction,
the mat has a first area located on the first side of the through hole portion in the first direction, and a second area located on the second side of the through hole portion in the first direction,
the first area of the mat has a first dimension in the second direction,
the second area of the mat has a second dimension in the second direction, and
the first dimension is larger than the second dimension.

16. The capacitive occupant sensor according to claim 1, wherein
the mat has
an enclosure portion located on an outer periphery of the mat, and
a through hole portion surrounded by the enclosure portion and the U-parts arranged in the second direction, the through hole portion penetrating the mat,
the through hole portion is surrounded by a linear portion corresponding to the enclosure portion linearly extending in the first direction and the plurality of U-parts arranged in the second direction, the linear portion has a dimension equal to or smaller than a half of a dimension of the mat in the first direction.

17. The capacitive occupant sensor according to claim 1, wherein the mat has an enclosure portion located on an outer periphery of the mat, and a through hole portion surrounded by the enclosure portion and the U-parts, the through hole portion penetrating the mat, the through hole portion is surrounded by a connector corresponding to the enclosure portion linearly extending in the second direction and the plurality of U-parts arranged in the first direction.

18. The capacitive occupant sensor according to claim 1, wherein at least a part of the plurality of S-parts has a symmetric arrangement relative to an imaginary center line of the mat extending in the first direction.

19. The capacitive occupant sensor according to claim 1, further comprising:

a seat-shaped urethane pad having a first face, wherein the first face of the urethane pad has a plane size larger than that of the mat, and the mat is bonded to the first face of the urethane pad.

20. The capacitive occupant sensor according to claim 19, further comprising:

a double-faced adhesive portion bonded to a second face of the urethane pad opposite from the first face, wherein the mat has an enclosure portion located on an outer periphery of the mat, and a through hole portion surrounded by the enclosure portion and the plurality of U-parts, the through hole portion penetrating the mat, and the adhesive portion is located to surround a position of the second face defined by projecting the through hole portion.

21. The capacitive occupant sensor according to claim 19, wherein the urethane pad has a conduction hole passing through the urethane pad.

22. The capacitive occupant sensor according to claim 21, wherein the conduction hole is one of a plurality of conduction holes, and the urethane pad has a connecting portion connecting edges of the conduction holes located adjacent to each other.

23. The capacitive occupant sensor according to claim 21, wherein the conduction hole is defined in the urethane pad in a manner that at least a part of the conduction hole communicates with the opening.

24. The capacitive occupant sensor according to claim 21, wherein the conduction hole is located on an end portion of the mat in the first direction.

25. The capacitive occupant sensor according to claim 19, wherein the mat has a linear portion located on an outer periphery of the mat along the first direction, and a through hole portion surrounded by the linear portion and the plurality of U-parts arranged in the second direction, the through hole portion penetrating the mat, and the urethane pad has a communication hole portion communicating with the through hole portion of the mat.

* * * * *